US009889923B2

(12) United States Patent
Salmon et al.

(10) Patent No.: US 9,889,923 B2
(45) Date of Patent: Feb. 13, 2018

(54) KRUEGER FLAP ASSEMBLY SYSTEMS AND METHODS

(71) Applicant: The Boeing Company, Chicago, IL (US)

(72) Inventors: Huw James Salmon, Renton, WA (US); Roberto J. Gomez, Renton, WA (US)

(73) Assignee: The Boeing Company, Chicago, IL (US)

( * ) Notice: Subject to any disclaimer, the term of this patent is extended or adjusted under 35 U.S.C. 154(b) by 403 days.

(21) Appl. No.: 14/791,237

(22) Filed: Jul. 2, 2015

(65) Prior Publication Data

US 2017/0001711 A1    Jan. 5, 2017

(51) Int. Cl.
| | | |
|---|---|---|
| *B64C 9/22* | (2006.01) | |
| *B64C 3/50* | (2006.01) | |
| *B64C 7/02* | (2006.01) | |
| *B64C 9/24* | (2006.01) | |
| *B64C 3/48* | (2006.01) | |

(52) U.S. Cl.
CPC .................. *B64C 9/22* (2013.01); *B64C 3/48* (2013.01); *B64C 3/50* (2013.01); *B64C 7/02* (2013.01); *B64C 9/24* (2013.01); *Y02T 50/145* (2013.01); *Y02T 50/32* (2013.01)

(58) Field of Classification Search
CPC .... B64C 3/48; B64C 9/26; B64C 3/50; B64C 2003/148; B64C 2230/26; Y02T 50/32
See application file for complete search history.

(56) References Cited

U.S. PATENT DOCUMENTS

| | | | |
|---|---|---|---|
| 4,427,168 A | 1/1984 | McKinney et al. | |
| 6,073,889 A | 6/2000 | Dees et al. | |
| 6,364,254 B1 | 4/2002 | May | |
| 9,016,637 B2 | 4/2015 | Sakurai et al. | |
| 9,745,049 B2 * | 8/2017 | Wilson | B64C 7/00 |
| 2005/0274846 A1 | 12/2005 | Dun | |

FOREIGN PATENT DOCUMENTS

EP          1338506 A1     8/2003

* cited by examiner

*Primary Examiner* — Brian M O'Hara
(74) *Attorney, Agent, or Firm* — Haynes and Boone, LLP

(57) ABSTRACT

Systems and methods according to one or more embodiments are provided for a Krueger flap assembly with dual Krueger seal assemblies. In certain embodiments, the dual Krueger seal assemblies may seal a space between a Krueger flap main body and an aircraft engine. Further seals may be provided to seal any gaps between the dual Krueger seal assemblies. In certain embodiments, one or both of the dual Krueger seal assemblies may include centrally grounded springs. The dual Krueger seal assemblies may include a plurality of springs supporting each Krueger seal assembly.

20 Claims, 11 Drawing Sheets

KRUEGER FLAP ASSEMBLY SYSTEMS AND METHODS

TECHNICAL FIELD

The invention relates generally to aircraft wings and, more particularly, to aircraft wings with Krueger flaps.

BACKGROUND

Krueger flaps are devices fitted typically to the leading edge of an aircraft wing to increase lift generated by the wing. For example, Krueger flaps may fold out from underneath the leading edge of the wing. In certain aircrafts, engines may also be fitted underneath the aircraft wing. Krueger flaps fitted to the wing may thus not extend the entire length of the wing and may need to avoid contacting the engines when folding out.

SUMMARY

Systems and methods are disclosed herein providing a Krueger seal with dual Krueger seals. The apparatus may include a Krueger flap main body, a first seal door, a second seal door, and a seal member. The Krueger flap main body may be configured to be movably coupled to a leading edge of an aircraft wing. The first seal door may be hinged to the Krueger flap main body and may include a first seal door body and one or more first seal door springs. The first seal door springs may be configured to bias the first seal door away from the Krueger flap main body. The second seal door may be hinged to the Krueger flap main body adjacent to the first seal door. The second seal door may include a second seal door body and one or more second seal door springs. The second seal door springs may be configured to bias the second seal door away from the Krueger flap main body. The seal member may be coupled to at least one of the first or second seal doors and configured to seal, at least partly, a gap between the first seal door and the second seal door.

In another embodiment, a method may be provided. The method may include rotating a Krueger flap main body in front of a leading edge of an aircraft wing, biasing a first seal door away from the Krueger flap main body, biasing a second seal door away from the Krueger flap main body, substantially sealing, with the first and second seal doors, a gap between the Krueger flap main body and a nacelle of an engine, and substantially sealing a gap between the first seal door and the second seal door.

In an additional embodiment, a method of assembly may be provided. The method may include receiving a Krueger flap assembly, attaching a second end of the flap hinge to a wing hinge located on a leading edge of an aircraft wing, attaching a first end of an actuator to the aircraft wing, and attaching a second end of the actuator to the Krueger flap main body. The Krueger flap assembly may include a Krueger flap main body, a flap hinge with a first end mechanically connected to the Krueger flap main body and the second end, a first seal door hinged to the Krueger flap main body, a second seal door hinged to the Krueger flap main body adjacent to the first seal door, and a seal member coupled to at least one of the first or second seal doors.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In certain embodiments, Krueger flaps may be fitted to the leading edge of an aircraft wing to increase lift. When required, such as during low airspeed situations, the Krueger flaps may fold out from underneath the leading edge of the wing. In certain such aircraft equipped with Krueger flaps, one or more engines may also be fitted to the underside of each aircraft wing. The engine may include a cowling and conventional Krueger flap designs may leave gaps between the Krueger flap and the engine when the Krueger flap is deployed or extended. In addition, the engine may include one or more thrust reversers that may deploy during landing or servicing. Such thrust reversers may further occupy space between the nacelle and the nozzle.

Figure 1:
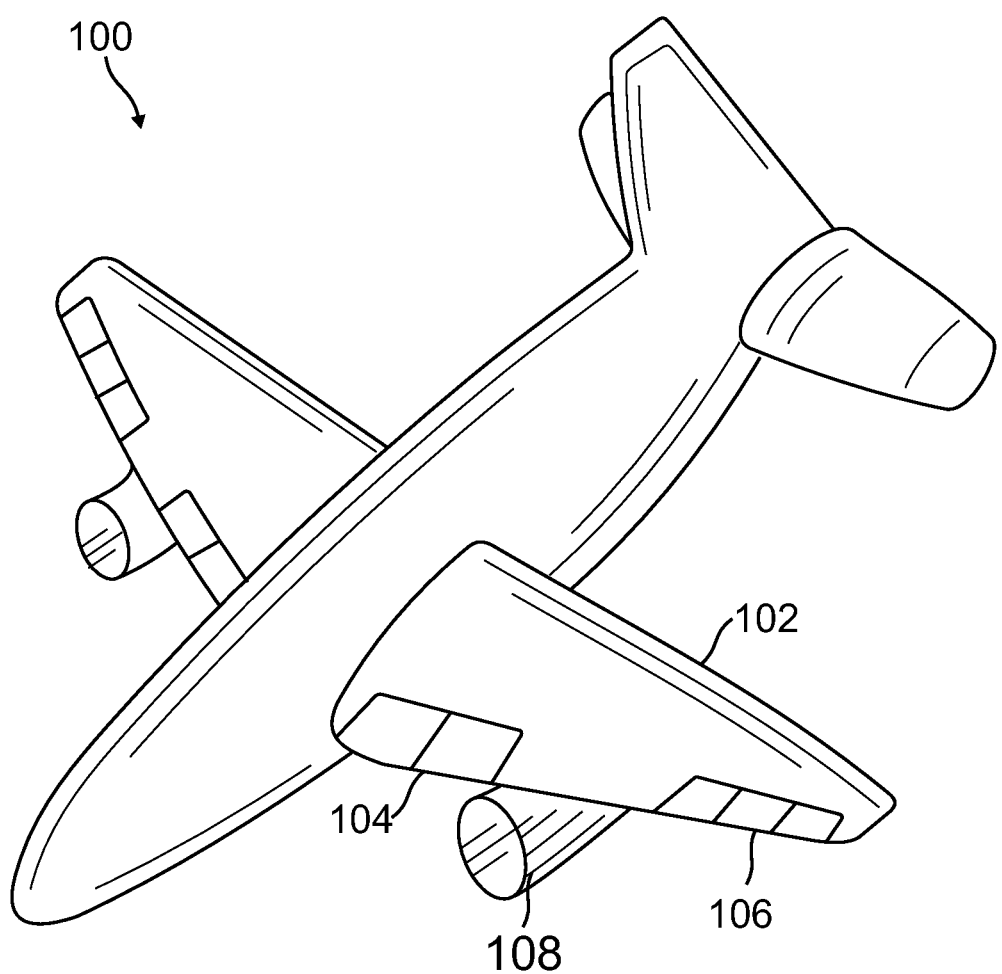
FIG. 1 illustrates an aircraft with a Krueger flap in accordance with an embodiment of the disclosure.

FIG. 1 illustrates an aircraft with a Krueger flap in accordance with an embodiment of the disclosure. In FIG. 1, aircraft 100 includes a wing 102 with an inboard flap 104, an outboard flap 106, and an engine 108. The aircraft 100 may be any type of aircraft.

The wing 102 may, in certain embodiments, be a main wing, an aft wing, a canard, or another lift generating device of an aircraft. The inboard flap 104 and/or the outboard flap 106 may be a Krueger flap or multiple Krueger flaps. In certain embodiments, both the inboard flap 104 and the outboard flap 106 may be Krueger flaps, but other embodiments may feature Krueger flaps on only the inboard flap 104 or the outboard flap 106. In the embodiment shown in FIG. 1, the inboard flap 104 may be a pair of Krueger flaps while the outboard flap 106 may be a set of slats.

The engine 108 may be located between the inboard flap 104 and the outboard flap 106. In certain embodiments, the inboard flap 104 and/or the outboard flap 106 may include features to seal any gaps between the main flap (i.e., the portion of the inboard flap 104 or the outboard flap 106 that makes up the majority of the flap) and the engine 108. Such sealing features may increase the aerodynamic efficiency or lift of the wing 108 when the inboard flap 104 and/or the outboard flap 106 are deployed.

Figure 2A:
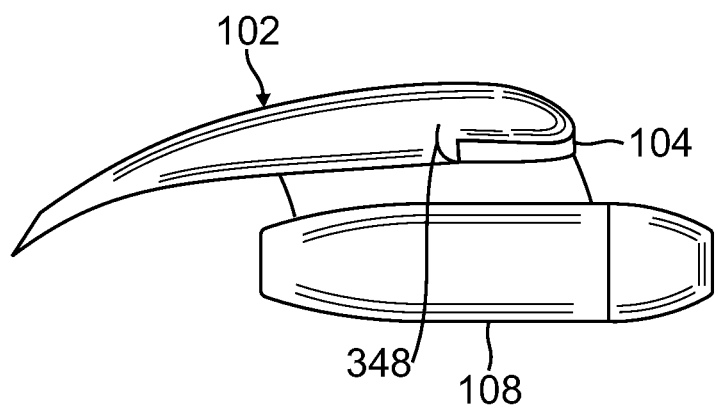
FIGS. 2A-B illustrate the operation of an aircraft wing with a Krueger flap in accordance with an embodiment of the disclosure.
Figure 2B:
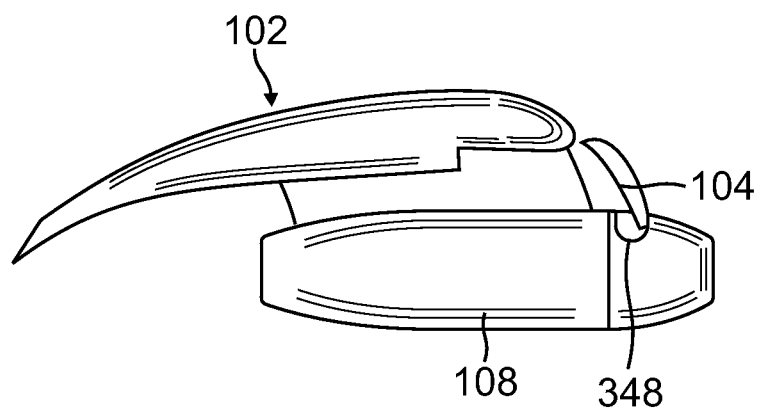

FIGS. 2A-B illustrate the operation of an aircraft wing with a Krueger flap in accordance with an embodiment of the disclosure. FIGS. 2A-B include the wing 102, the inboard flap 104, and the engine 108 of FIG. 1 as well as the bullnose assembly 348. The inboard flap 104 of FIGS. 2A-B may be a Krueger flap.

In FIG. 2A, the inboard flap 104 and the bullnose assembly 348 of the wing 102 may not yet be deployed. Accordingly, the inboard flap 104 and the bullnose assembly 348 may be folded against the bottom of the wing 102. In FIG. 2B, the inboard flap 104 and the bullnose assembly 348 may be deployed. In certain embodiments, the inboard flap 104 may be hinged to the front of the wing 102. In certain such embodiments, the inboard flap 104 may be hinged to the leading edge of the wing 102, possibly along a hingeline.

When the inboard flap 104 is deployed, the inboard flap 104 may fold outward along the hingeline. The inboard flap 104, as well as the bullnose assembly 348 attached to the inboard flap 104, may rotate out in front of the leading edge of the wing 102 and may enhance the amount of lift created by the wing 102.

Figure 3:
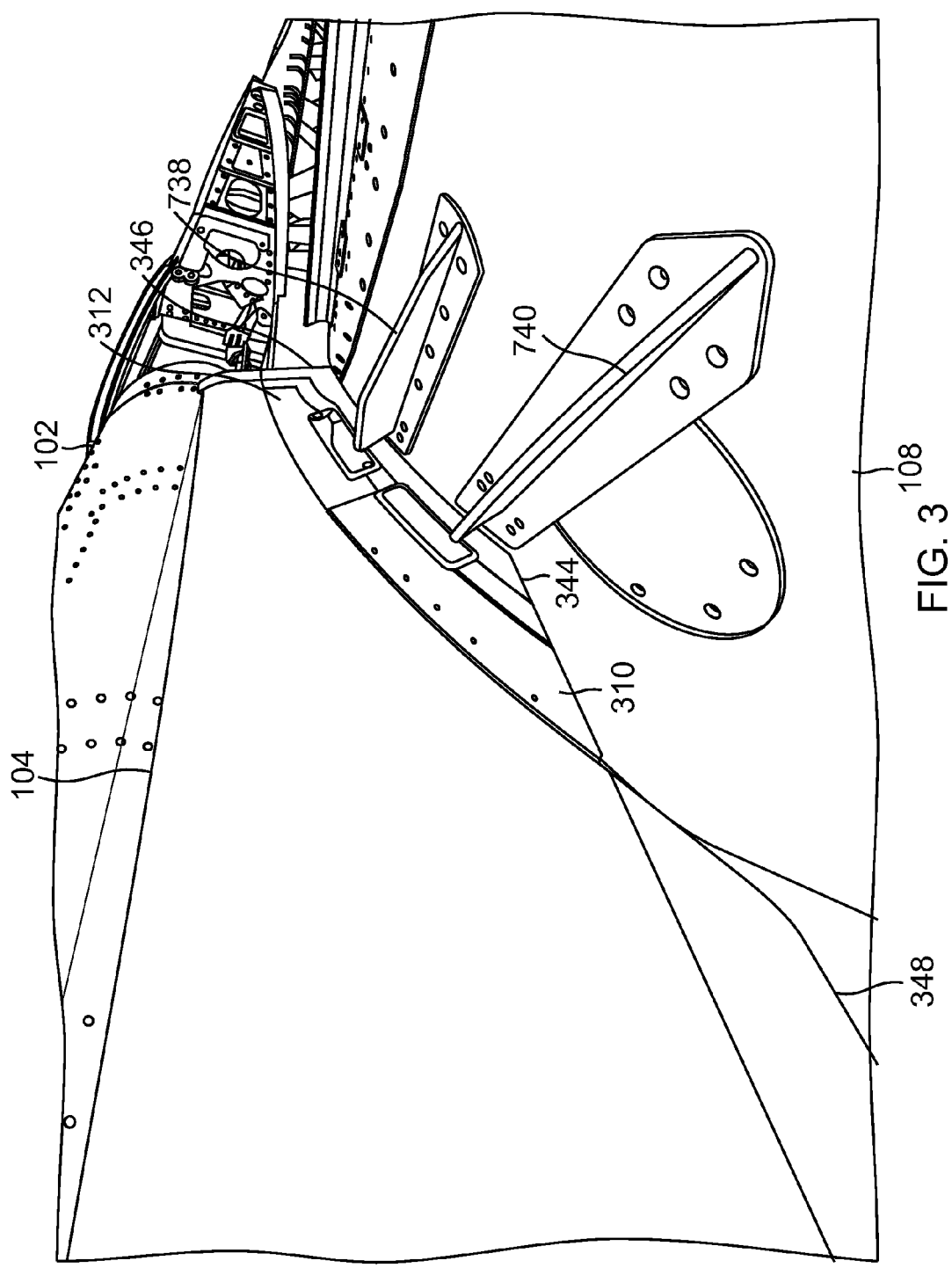
FIG. 3 illustrates an aircraft wing with an extended Krueger flap with dual Krueger seals in accordance with an embodiment of the disclosure.

In certain embodiments, the inboard flap may be a Krueger flap with dual Krueger seals. The dual Krueger seals may, when the Krueger flap is extended, seal the Krueger flap against the engine. FIG. 3 illustrates an aircraft wing with an extended Krueger flap with dual Krueger seals in accordance with an embodiment of the disclosure.

FIG. 3 includes the wing 102, the inboard flap 104, the bullnose assembly 348, and the engine 108 of FIGS. 2A-B. In FIG. 3, the inboard flap 104 may additionally include inboard Krueger seal assembly 310 and outboard Krueger seal assembly 312. The inboard Krueger seal assembly 310 may include the inboard blade seal 344 and the outboard Krueger seal assembly 312 may include the outboard blade seal 346. The engine 108 may include deflectors 738 and 740. Though reference is made herein towards inboard and outboard flaps and seals, it is appreciated that various embodiments may change include features of inboard flaps and seals on outboard flaps and seals, respectively, and vice versa.

Referring back to FIG. 3, the inboard flap 104 may be deployed by folding outward from the wing 102 along a hingeline of the wing 102. When the inboard flap 104 is deployed, the inboard Krueger seal assembly 310 and the outboard Krueger seal assembly 312 may fully or partially seal an area between the inboard flap 104 and the engine 108 to prevent or decrease air from bypassing the inboard flap 104. In certain embodiments, the inboard Krueger seal assembly 310 and/or the outboard Krueger seal assembly 312 may seal the area between the engine 108 via the inboard blade seal 344 and the outboard blade seal 346, respectively. In various embodiments, the blade seals may be fabric covered, fiberglass reinforced, silicone rubber seals or may be other materials.

In certain embodiments, the inboard Krueger seal assembly 310 and the outboard Krueger seal assembly 312 may seal against the engine 108 via the inboard blade seal 344 and the outboard blade seal 346, respectively, by, for example, physically contacting at least part of the engine 108 with the seals or by placing the seals within a threshold distance from the engine 108 to minimize the gap between the seals and the engine and minimize the bypass of air around the inboard flap 104 and the Krueger seal assemblies 310 and 312.

Figure 4:
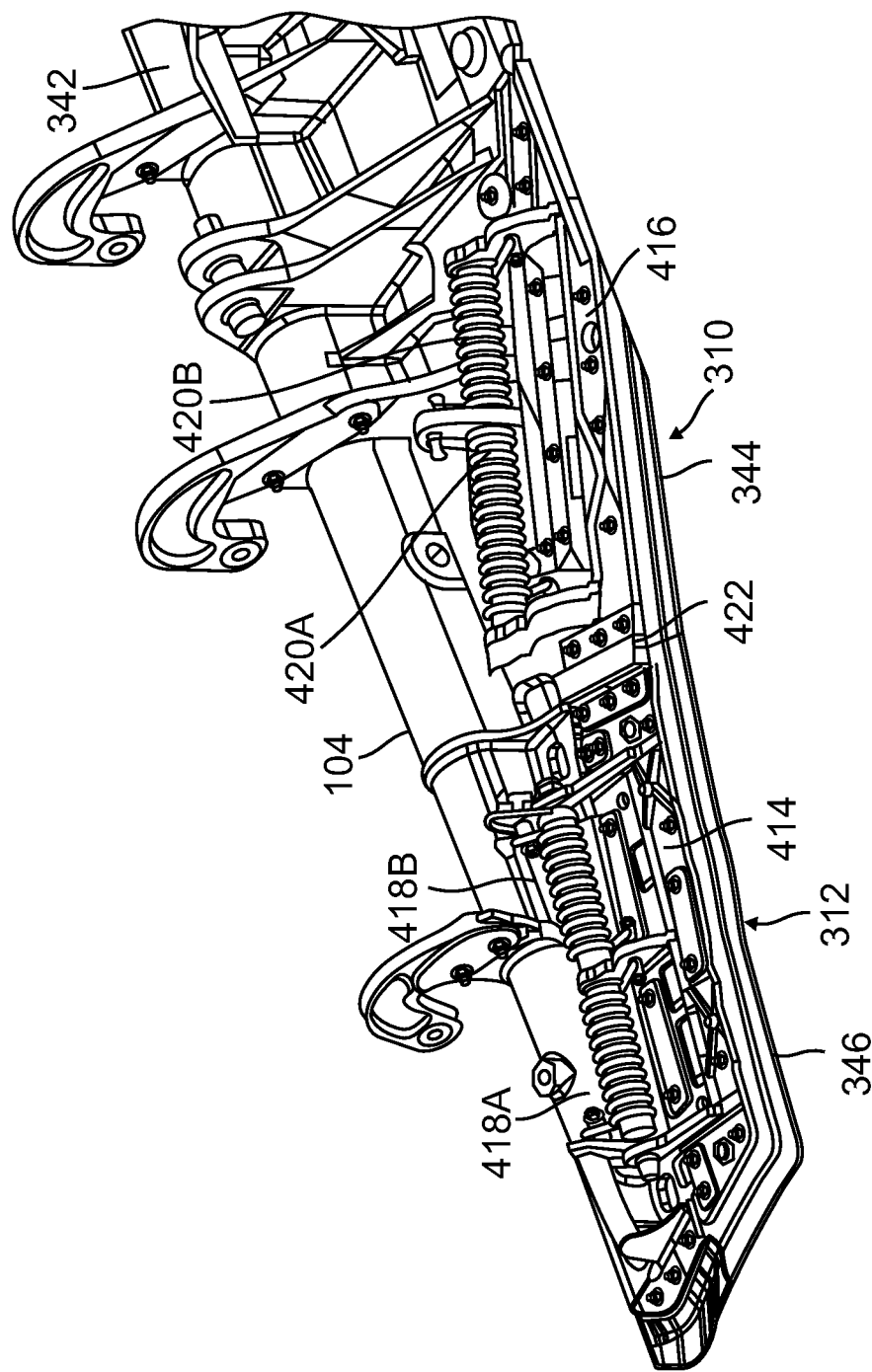
FIG. 4 illustrates a Krueger flap assembly with dual Krueger seals in accordance with an embodiment of the disclosure.

One or both of the Krueger seal assemblies 310 and 312 may be spring loaded. Springs attached to the Krueger seal assemblies 310 and 312 may deploy the seals and position the seals to seal the gap between the inboard flap 104 and the engine 108. FIG. 4 further illustrates springs used to load the Krueger flap seals.

FIG. 4 illustrates a Krueger flap assembly with dual Krueger seals in accordance with an embodiment of the disclosure. FIG. 4 includes the inboard flap 104 with the inboard Krueger seal assembly 310 and the outboard Krueger seal assembly 312. FIG. 4 shows the "back" of the flap and the Krueger flap seals. That is, the components shown in FIG. 4 are located on the inside of a wing when the inboard flap 104 is retracted and are substantially facing away from the direction of travel of the aircraft when the inboard flap is deployed.

The inboard Krueger seal assembly 310 may include the inboard seal assembly 416 and the inboard springs 420A and 420B as well as the inboard blade seal 344. The inboard seal assembly 416 may include a flap or multiple flaps that may form the body of the Krueger seal assembly 310 and may also include various fittings and bearings to, for example, attach the inboard Krueger seal assembly 310 to the inboard flap 104 and allow for the Krueger seal assembly 310 to rotate relative to the inboard flap 104. The seal assembly 416 may be manufactured as a casting that may then be machined and finished or may be manufactured from sheetmetal (including sheet aluminum) via forming, stamping, and trimming. In certain embodiments, the seal assembly 416 may include features that allow the Krueger seal assembly 310 to rotate in only one direction relative to the inboard flap 104. For example, in certain embodiments, the Krueger seal assembly 310 may be configured to only rotate towards the wing, when viewed from the prospective of a deployed inboard flap 104.

The inboard springs 420A and 420B may be any type of springs appropriate to bias the inboard Krueger seal assembly 310 away from the inboard flap 104 and provide support to keep the Krueger seal assembly 310 deployed during operating conditions. Examples of such springs include torsion springs, torsion bars, leaf springs, coil springs, and other materials with spring characteristics. Accordingly, the inboard springs 420A and 420B may need to have a spring rate high enough to react the airload, imparted by wind generated by environmental conditions and by the movement of the aircraft, on the inboard Krueger seal assembly 310 when the inboard seal 104 is deployed. For the purposes of this disclosure, "bias away" may include positioning the Krueger seal assemblies to seal a gap between the main body of the inboard flap 104 (i.e., the portion of the inboard flap 104 not including the Krueger seal assemblies) and/or positioning the Krueger seal assemblies to not be folded against the main body of the inboard flap 104. "Bias towards" may include folding the Krueger flap towards the main body of the inboard flap 104. In certain such embodiments, the inboard springs 420A and 420B may be configured to react the airload imparted under normal operating conditions (i.e., the springs may be not stiff enough to resist airload of an aircraft going its maximum speed). While the Krueger seal assemblies 310 and 312 may both be biased by two springs, other embodiments may include one spring or more than two springs. Certain embodiments may limit the springs to a rate below a spring rate threshold. In a certain embodiment, a non-limiting example of such a spring rate threshold may be about 144.5 lb/in., though other embodiments may include other spring rate thresholds including spring rate thresholds between 100-200 lb/in. In such embodiments, multiple springs may be used to bias the Krueger flap seals to keep the spring rate of each individual spring below the spring rate threshold.

The inboard ends (the ends towards the center of the inboard Krueger seal assembly 310) of the springs 420A and 420B may be attached to features on the inboard flap 104. For example, the inboard springs 420A and 420B may be torsion springs with legs on each end. The inboard flap 104 may include features such as posts, fittings, spring bottoms, spring perches, etc. to allow for the inboard end of the springs 420A and 420B to push against. The outboard ends (the ends towards the edges, e.g. the left and the right side as shown in FIG. 4, of the inboard Krueger seal assembly 310) of the springs 420A and 420B, and specifically features configured to load or preload the springs 420A and 420B, may attach to features, such as posts, fittings, spring bottoms, spring perches, etc. on the inboard Krueger seal assembly 310. The springs of such a configuration may be referred to as being "grounded" on the inboard flap 104. The springs 420A and 420B may then be preloaded such that, when the inboard flap 104 is deployed, the springs also deploy the inboard Krueger seal assembly 310.

The outboard Krueger seal assembly 312 may include the outboard seal assembly 414 and the outboard springs 418A and 418B as well as the outboard blade seal 346. The outboard seal assembly 414 and the outboard blade seal 346 may include any of the features described herein for the inboard seal assembly 416 and the inboard blade seal 344. Additionally though, the springs 418A and 418B may be grounded on the outboard Krueger seal assembly 310 instead of on the inboard flap 104. That is, the inboard ends of the springs 418A and 418B may be attached to features on the outboard seal assembly 414 while the outboard ends of the springs 418A and 418B may be attached to features on the inboard flap 104. Such a configuration may allow for a more desirable form factor in certain conditions. An example of such a condition is when springs grounded on the inboard flap 104 would contact another component. In such a condition, grounding the springs on the outboard seal assembly 414 may allow for the springs to be fitted whereas springs grounded on the inboard flap 104 may contact other components, such as a torque tube on the inboard flap 104.

The springs 418A, 418B, 420A, and 420B may be any combination of springs with the same or different spring rates, lengths, and other dimensions. For example, all of the springs 418A, 418B, 420A, and 420B may be springs of the same design, springs 418A and 418B may be springs of a different design as compared to springs 420A and 420B, or springs 418A and 420A may be springs of a different design as compared to springs 418B and 420B.

Additionally, a seal 422 may be attached to either or both of the Krueger seal assemblies 310 and 312. The seal may be a flexible seal such as a rubber seal, a gasket, a metal plate, or another type of seal that may prevent airflow from bypassing the Krueger seal assemblies 310 and 312 and flow through the gap between the Krueger seal assemblies 310 and 312. The seal 422 may be fitted to prevent airflow from flowing through the gap. In embodiments where the seal 422 may be attached to both the Krueger seal assemblies 310 and 312, the seal 422 may be two or more pieces and one or some of the pieces may attach to the inboard Krueger seal assembly 310 and the remaining pieces may attach to the outboard Krueger seal assembly 312.

Figure 5A:
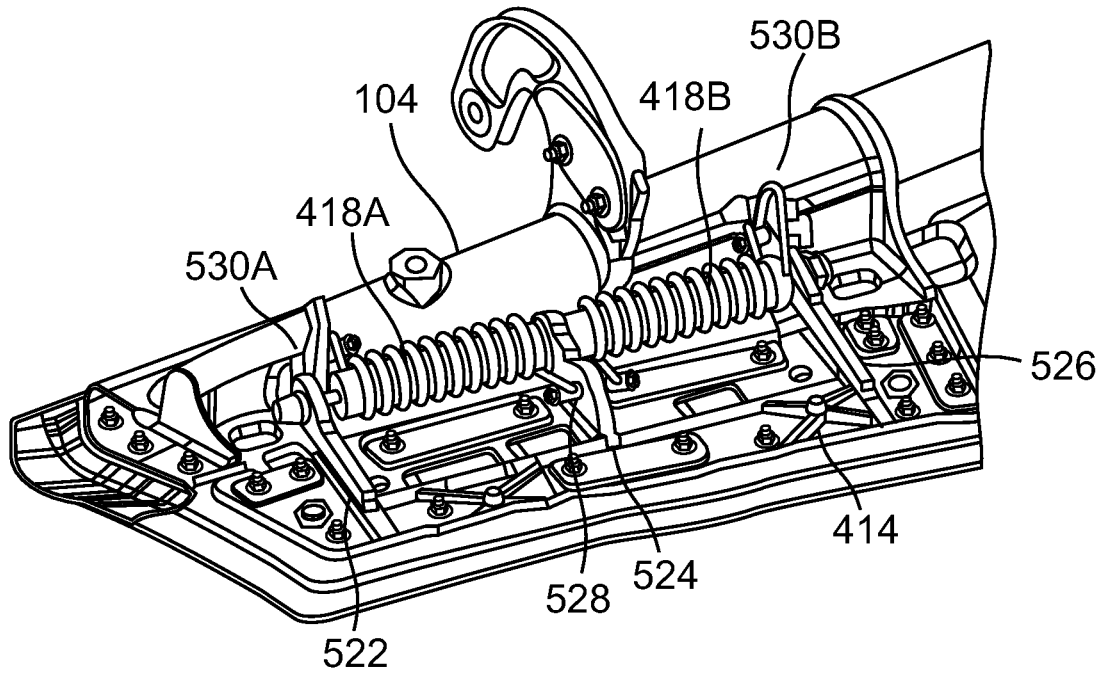
FIG. 5A illustrates an embodiment of a centrally actuated Krueger seal assembly in accordance with an embodiment of the disclosure.

Referring back to the grounding of springs on the Krueger seal assemblies, grounding the springs on the Krueger seal assemblies may be accomplished in a variety of different configurations. FIG. 5A illustrates an embodiment of a centrally actuated Krueger seal assembly in accordance with an embodiment of the disclosure.

In FIG. 5A, the seal assembly 414 includes ribs 522, 524, and 526. One, some or all of the ribs 522, 524, and 526 may include attachment features to attach the ribs to the inboard flap 104. The attachment features may include bearings, hinges, bushings, joints such as ball joints, and other features that may allow the Krueger seal assembly to rotate relative to the inboard flap 104.

In FIG. 5A, the rib 524 may include a stop fitting 528. In certain embodiments, the stop fitting 528 may be a fitting or surface adapted to allow a spring or a part of a spring to push against. The stop fitting 528 may then transfer the force from the spring to the seal assembly 414. The force from the spring may bias the Krueger seal assembly away from the inboard flap 104.

The inboard ends of the springs 418A and 418B may be grounded to the stop fitting 528. The inboard ends of the springs 418A and 418B may also be attached to the rib 524 (that is, if the springs 418A and 418B are torsion springs, the cylindrical parts of the torsion springs may be connected to the rib 524). In certain embodiments, a portion of the stop fitting 528 may be located on either side of the rib 524.

In FIG. 5A, the main body of the inboard flap 104 may include stop fittings 530A and 530B. The stop fittings 530A and 530B may or may not include features (such as bearings, bushings, joints, and hinges) that may attach to the ribs 522 and 526. In certain embodiments, the ribs 522 and 526 may attach to separate features located on the main body of the inboard flap 104.

Figure 5B:
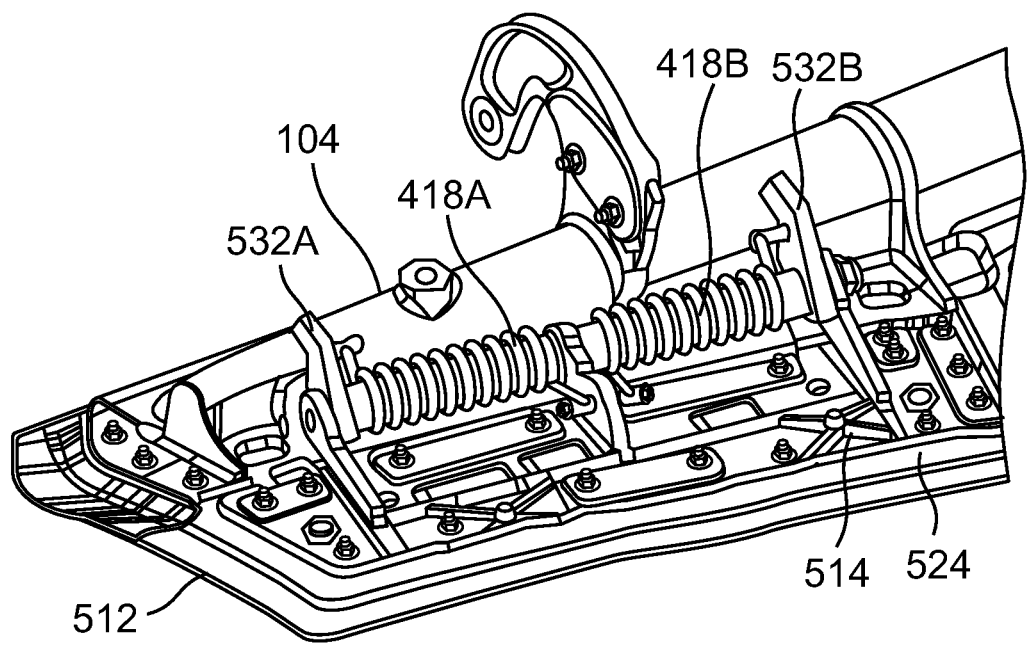
FIG. 5B illustrates another embodiment of a centrally actuated Krueger seal assembly in accordance with an embodiment of the disclosure.

FIG. 5B illustrates another embodiment of a centrally actuated Krueger seal assembly in accordance with an embodiment of the disclosure. In FIG. 5B, the outboard ends of the springs 418A and 418B may be grounded to stop fittings 532A and 532B, respectively. Additionally, the outboard ends of the springs 418A and 418B may be attached to the stop fittings 532A and 532B. That is, if the springs 418A and 418B are torsion springs, the cylindrical parts of the outboard ends of the torsion springs may be connected to the stop fittings 532A and 532B. Accordingly, the seal assembly 514 may only include one rib 524. In such embodiments, the seal assembly 514 and/or the inboard flap 104 may include additional features to prevent side to side translation of the seal assembly 514.

Figure 6:
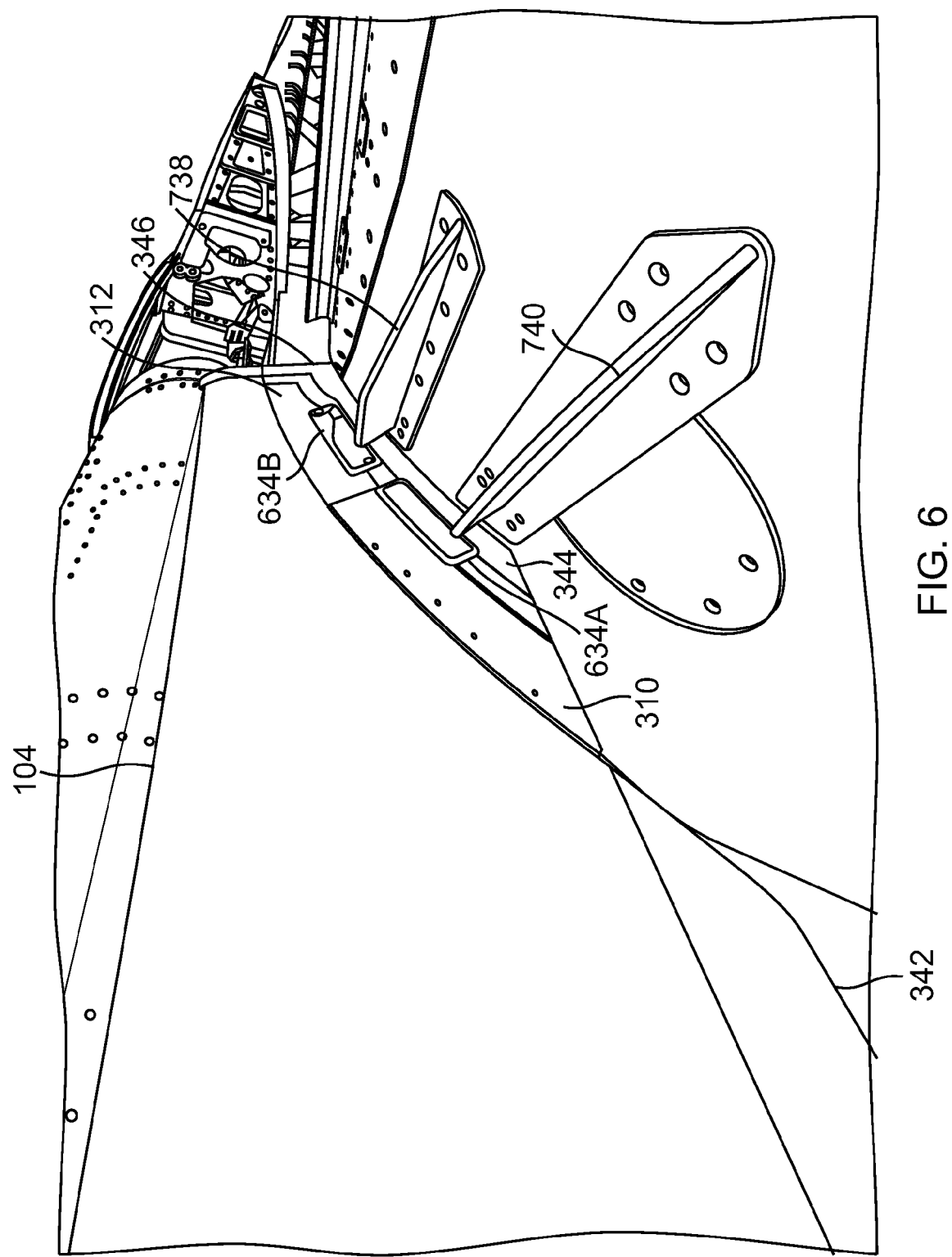
FIG. 6 illustrates a deployed Krueger flap assembly with dual Krueger seals that include striker plates in accordance with an embodiment of the disclosure.

In certain embodiments, the Krueger seal assemblies may include striker plates. FIG. 6 illustrates a deployed Krueger flap assembly with dual Krueger seal assemblies that include striker plates in accordance with an embodiment of the disclosure.

FIG. 6 includes the inboard flap 104 with the bullnose assembly 342 and the Krueger seal assemblies 310 and 312 with the inboard blade seal 344 and the outboard blade seal 346. The Krueger seal assemblies 310 and 312 include the striker plates 634A and 634B, respectively. The striker plates 634A and 634B may be plates attached to a side of the Krueger seal assemblies 310 and 312. In certain embodiments, the striker plates 634A and 634B may be attached to the side of the Krueger seal assemblies that, when the inboard flap 104 is deployed, faces towards the front of the aircraft.

The striker plates 634A and 634B may be adapted to contact a portion of the engine of the aircraft. In certain embodiments, the striker plates 634A and 634B may be adapted to contact a portion of the engine nacelle, the thrust reverser, or another panel of the engine. In FIG. 6, the striker plates 634A and 634B may be adapted to contact the deflectors 740 and 738. The striker plates 634A and 634B may be a rectangular shape, but may also be other shapes such as oval, circular, or other geometries. In certain embodiments, the striker plates 634A and 634B may be shaped to cover at least the area that the engine nacelle, thrust reverser, and/or other panel of the engine is expected to contact.

The striker plates 634A and 634B may be made from any appropriate material including steel, aluminum, titanium, composites such as carbon fiber, fiberglass, and Kevlar, and other materials. The striker plates 634A and 634B may be attached to the Krueger seal assemblies 310 and 312 via fasteners such as screws and rivets, via adhesives such as glue, or via other means such as welding or brazing. The striker plates 634A and 634B may be attached to the Krueger seal assemblies 310 and 312 in a manner that may allow for the replacement of worn or damaged striker plates.

Figure 7A:
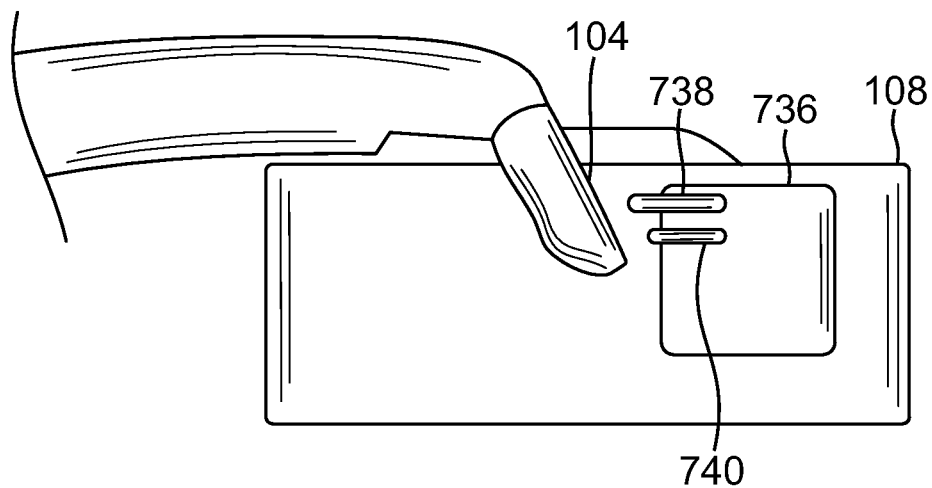
FIGS. 7A-C illustrate a sequence of deflecting Krueger seals that include striker plates in accordance with an embodiment of the disclosure.
Figure 7B:
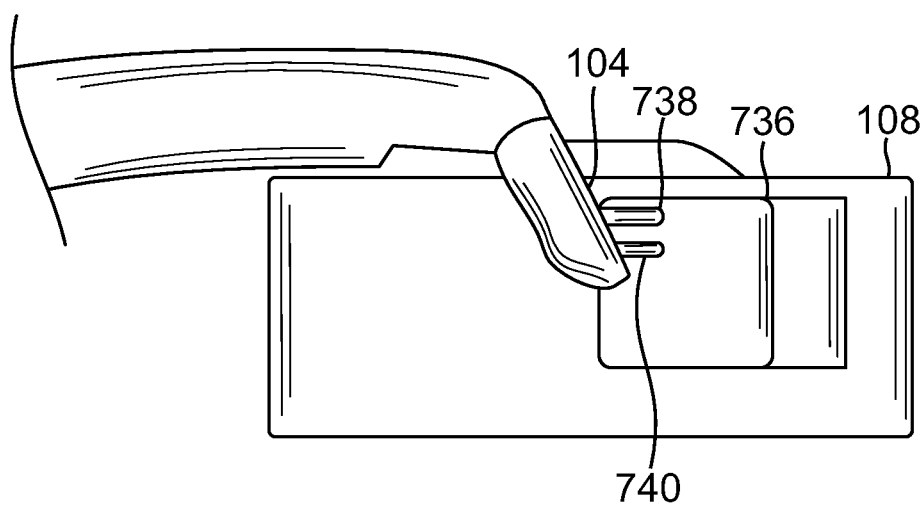
Figure 7C:
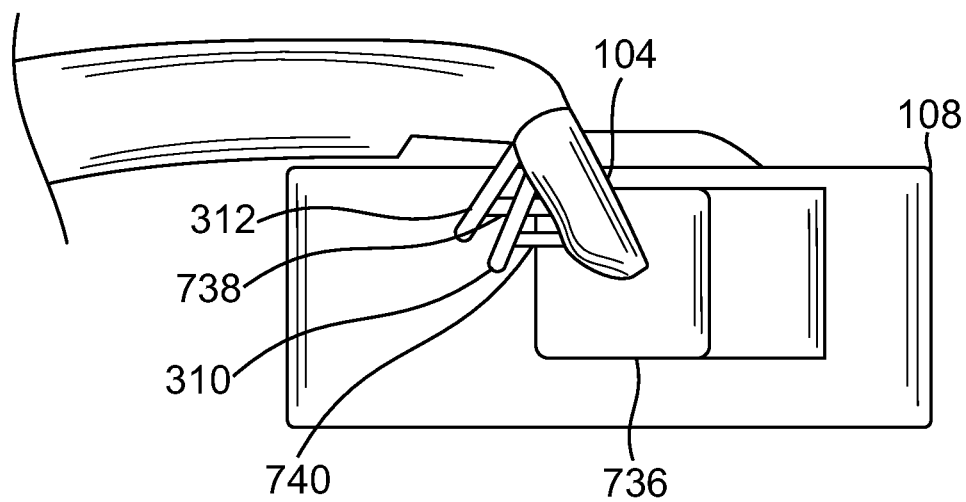

Operation of Krueger seal assemblies with striker plates is illustrated in FIGS. 7A-C. FIGS. 7A-C illustrate a sequence of deflecting Krueger seals that include striker plates in accordance with an embodiment of the disclosure.

In FIG. 7A, the inboard flap 104 is deployed. The inboard flap 104 includes the Krueger seal assemblies 310 and 312 (not shown in FIGS. 7A and 7B, but shown in FIG. 7C). The Krueger flap seal assemblies may include striker plates.

FIG. 7A also includes the engine 108. The engine 108 includes a thrust reverser sleeve 736 with deflectors 738 and 740. In FIG. 7A, the thrust reverser sleeve 736 may be in a closed position. That is, the thrust reverser sleeve 736 may be closed against the engine and so there may be no bypass of thrust through the thrust reverser.

In FIG. 7B, the thrust reverser sleeve 736 has opened and has translated rearwards towards the inboard flap 104. One or both of the deflectors 738 and 740 may have contacted striker plates on the Krueger seal assemblies, but may not have or may have only minimally deflected the Krueger seal assemblies. In certain embodiments, each deflector may be adapted to contact a different striker plate and/or a different Krueger seal assembly.

In certain embodiments, the thrust reverser sleeve 736 may be of a length that, when the inboard flap 104 is deployed, the thrust reverser sleeve 736 may not be opened without contacting the Krueger seal assemblies of the inboard flap 104. In such an embodiment, the striker plates may allow for the thrust reverser sleeve 736 to open by having the deflectors 738 and 740 push the Krueger seal assemblies out of the way of the opening path of the thrust reverser sleeve 736.

In FIG. 7C, the deflectors 738 and 740 have overcome the force of the mounting springs of the Krueger seal assemblies 310 and 312 and pushed back the Krueger seal assemblies 310 and 312. Accordingly, the thrust reverser sleeve 736 has continued to translate rearwards after contacting the striker plates in FIG. 7B and has fully opened.

Figure 8:
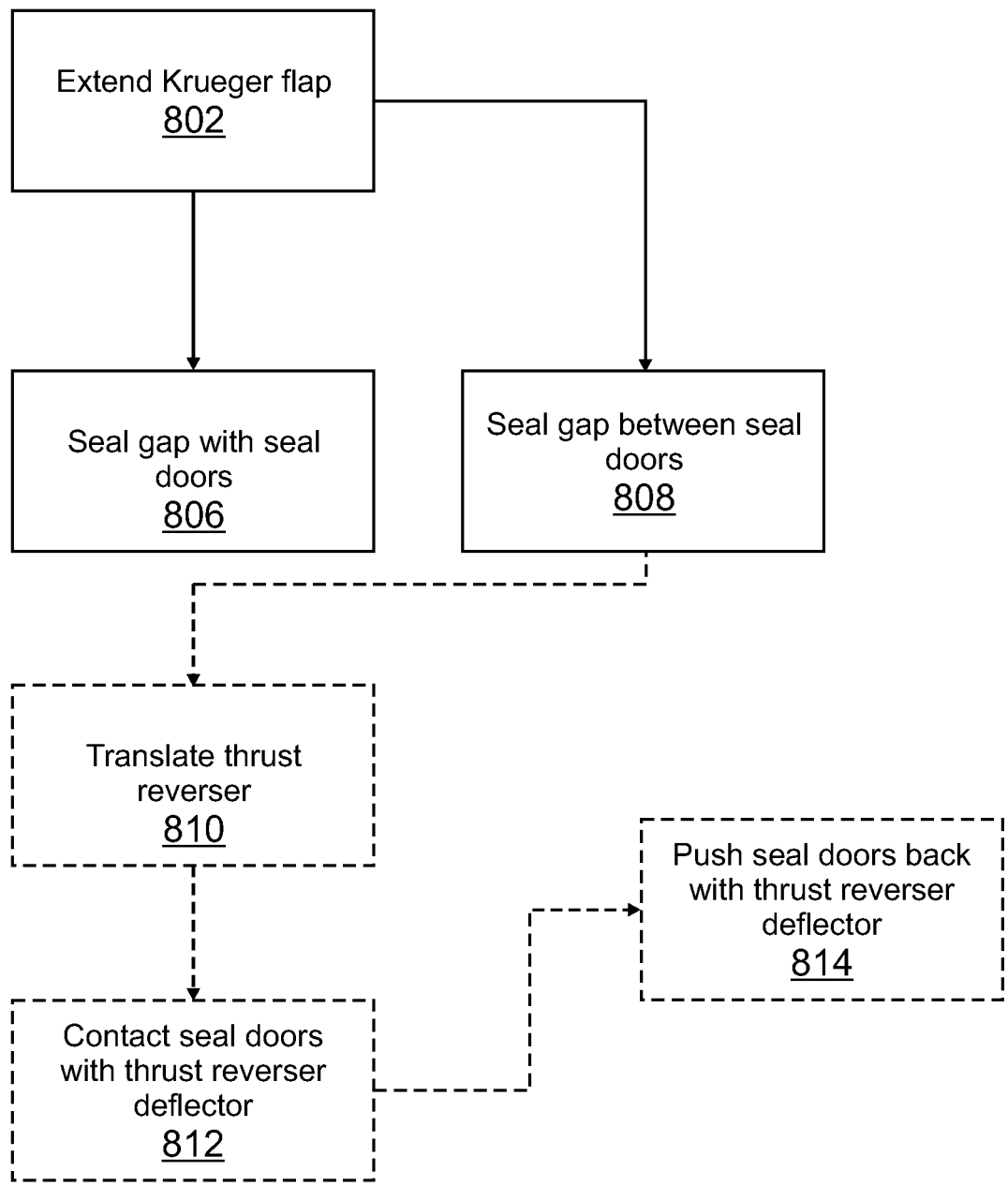
FIG. 8 illustrates a flowchart detailing a process of operating a Krueger flap assembly with dual Krueger seals in accordance with an embodiment of the disclosure.

Operation of the Krueger seal assemblies may be additionally detailed in FIG. 8. FIG. 8 illustrates a flowchart detailing a process of operating a Krueger flap assembly with dual Krueger seal assemblies in accordance with an embodiment of the disclosure.

In step 802, a Krueger flap is extended or deployed. The Krueger flap may fold out from underneath an airplane wing. The Krueger flap may be extended when the airplane is landing or during maintenance operations.

During deployment of the Krueger flap, the Krueger seal assemblies may be biased away from the Krueger flap main body by springs grounded on either the Krueger flap main body or the Krueger seal assemblies. In certain embodiments, the Krueger seal assemblies may be biased away from the Krueger flap main body when the Krueger flap is not extended or deployed (i.e., when the Krueger flap is retracted and positioned underneath the main aircraft wing), but other embodiments may bias the Krueger seal assemblies away from the Krueger flap during deployment of the Krueger flap or after the Krueger flap has been deployed.

After the deployment of the Krueger flap in step 802, the process may continue to steps 806 and 808. In step 806, the Krueger seal assemblies may seal a gap between the Krueger flap main body and the engine when the Krueger flap is extended. Certain such embodiments may seal a gap between the Krueger flap main body and the engine nacelle. Additionally, in step 808, embodiments with two or more Krueger seal assemblies may have gaps between the Krueger seal assemblies at least partially sealed.

In optional step 810, a thrust reverser sleeve of the engine is translated rearward during, for example, landing or maintenance operations. In optional step 812, the thrust reverser deflector may contact the Krueger seal assemblies at, for example, striker plates located on the Krueger seal assemblies. The thrust deflector may then push the Krueger seal assemblies rearwards during optional step 814.

Figure 9:
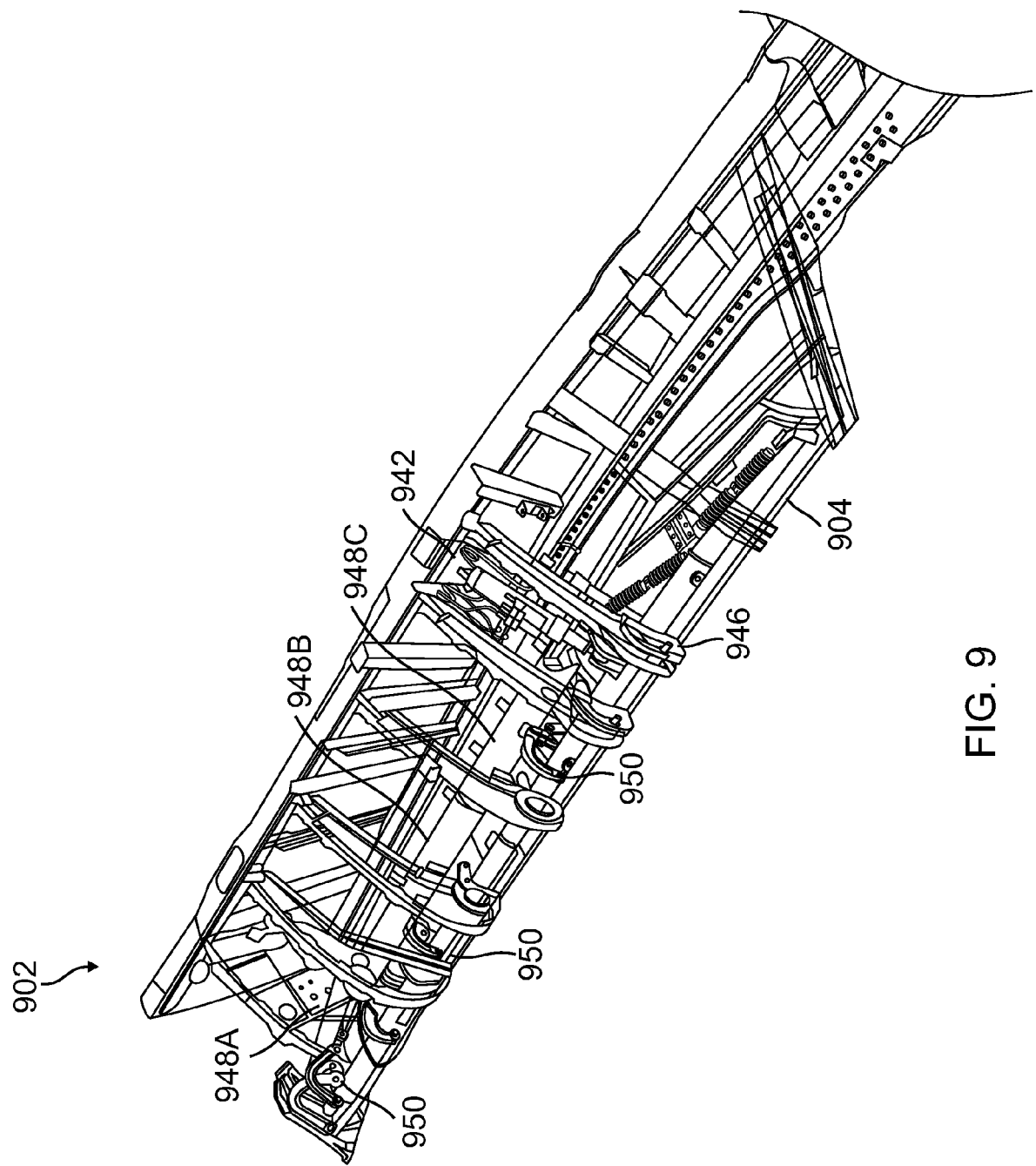
FIG. 9 illustrates a wing with a retracted Krueger flap in accordance with an embodiment of the disclosure.

FIG. 9 illustrates a wing with a retracted Krueger flap in accordance with an embodiment of the disclosure. The wing 902 includes the Krueger flap 904. The Krueger flap 904 may be attached to the wing 902 through one or more flap hinges 946 and/or one or more actuators 942. In certain embodiments, the Krueger flap 904 may include only some of the flap hinge 946 and the actuator 942. The Krueger flap 904 may also include an inner bullnose assembly 948A, a middle bullnose assembly 948B, and an outer bullnose assembly 948C. The bullnose assemblies 948A-C may be attached to the Krueger flap 904 through one or more bullnose drive linkages. In FIG. 9, three bullnose drive linkages 950 are shown, each linkage attached to one of the inner bullnose assembly 948A, the middle bullnose assembly 948B, and the outer bullnose assembly 948C.

The flap hinge 946 may be a curved hinge. The flap hinge 946 may control the distance between the main wing and the Krueger flap 904. A first end of the flap hinge 946 may be attached to the Krueger flap 904 via fasteners such as bolts and rivets, via adhesives such as glues, or via welding or brazing. A second end of the flap hinge 946 may be attached to a hinge or other flap hinge attachment feature on the main wing. The flap hinge attachment feature may include hinges, bearings, joints, bushings, and other features. A bolt or other removable fastener may hold the second end of the flap hinge 946 to the flap hinge attachment feature on the main wing.

The actuator 942 may provide the force to deploy and/or retract the Krueger flap 904. That is, the actuator 942 may be a hydraulic or electric actuator and may extend outward to deploy the Krueger flap 904 and may compress or reduce in length to retract the Krueger flap 904. The actuator 942 may also be attached to the Krueger flap 904 or features on the Krueger flap 904 at a first end and be attached to the main wing or features on the main wing at a second end. The actuator 942 may be attached to the Krueger flap 904 and/or the main wing through any of the techniques described for attaching the flap hinge 946.

The bullnose drive linkages 950 may, in certain embodiments, help in controlling the deployment of the bullnose assemblies 948A-C. Each of the bullnose drive linkage 950 may include a first end and a second end. The bullnose linkage 950 may be attached to the Krueger flap 904 or features on the Krueger flap at a first end and be attached to the a bullnose assembly or features on the bullnose assembly at a second end. The bullnose drive linkage 950 may be attached to the Krueger flap 904 and/or the bullnose assembly through any of the techniques described for attaching the flap hinge 946.

Figure 10:
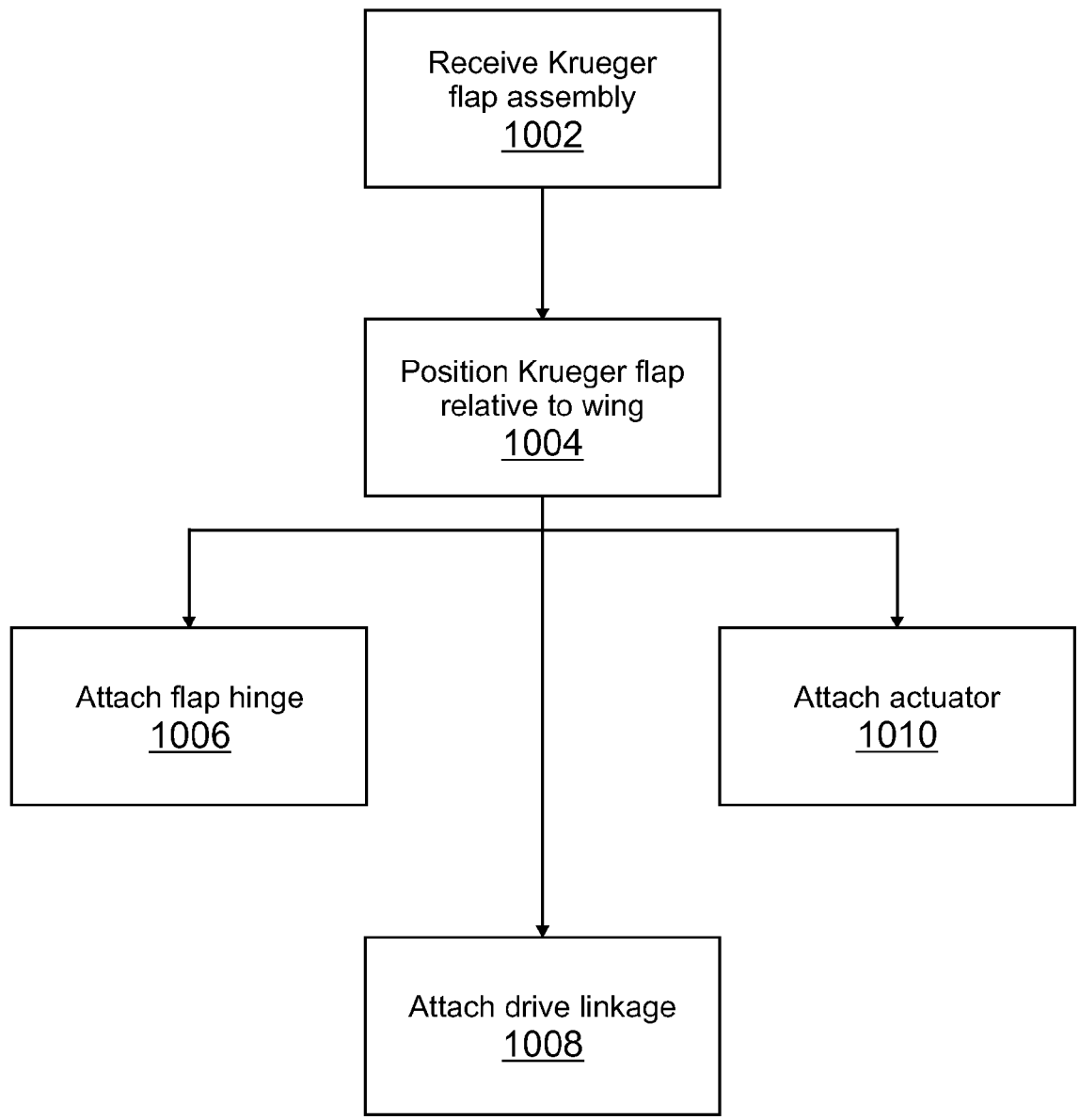
FIG. 10 illustrates a flowchart detailing a process of manufacturing an aircraft wing including a Krueger flap assembly with dual Krueger seals in accordance with an embodiment of the disclosure.

FIG. 10 illustrates a flowchart detailing a process of manufacturing an aircraft wing including a Krueger flap assembly with dual Krueger seal assemblies in accordance with an embodiment of the disclosure. In step 1002, the Krueger flap assembly, which may include a Krueger flap main body, Krueger seal assemblies, and associated other seals, may be received at an assembly point.

In step 1004, the Krueger flap assembly is moved into position to be assembled to the aircraft wing. Hinges between the aircraft wing and the Krueger flap assembly may be lined up and may be prepared for the insertion of fasteners.

In steps 1006, 1008, and 1010 the flap hinge, the drive linkage, and the actuator may be attached to the aircraft wing via one, some, or all of the attachment mechanisms described in FIG. 9. Additionally, any additional components associated with the aircraft wing and/or the Krueger flap assembly may also be attached.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An apparatus comprising:
a Krueger flap main body configured to be movably coupled to a leading edge of an aircraft wing;
a first Krueger seal assembly hinged to the Krueger flap main body, the first Krueger seal assembly comprising a first seal assembly body and one or more first seal assembly springs, the first seal assembly springs configured to bias the first Krueger seal assembly away from the Krueger flap main body;
a second Krueger seal assembly hinged to the Krueger flap main body adjacent to the first Krueger seal assembly, the second Krueger seal assembly comprising a second seal assembly body and one or more second seal assembly springs, the second seal assembly springs configured to bias the second Krueger seal assembly away from the Krueger flap main body; and
a seal member coupled to at least one of the first or second Krueger seal assemblies and configured to seal, at least partly, a gap between the first Krueger seal assembly and the second Krueger seal assembly.

2. The apparatus of claim 1, wherein:
the second Krueger seal assembly comprises a plurality of second seal assembly springs;
each second seal assembly spring comprises an outboard end and an inboard end;
the outboard end is mechanically connected to the Krueger flap main body; and
the inboard end is mechanically connected to the second seal assembly body.

3. The apparatus of claim 2, wherein:
the second seal assembly body comprises a first rib, a second rib, and a third rib;
the second Krueger seal assembly is hinged to the Krueger flap main body via at least the first rib and the third rib;
the second rib comprises a stop fitting; and
the inboard end of the second seal assembly springs is mechanically connected to the stop fitting.

4. The apparatus of claim 2, wherein:
the second seal assembly body comprises at least a middle rib;
the second Krueger seal assembly is hinged to the Krueger flap main body via at least the middle rib;
the middle rib comprises a stop fitting; and
the inboard end of the second seal assembly springs is mechanically connected to the stop fitting.

5. The apparatus of claim 1, wherein the first seal assembly springs and the second seal assembly springs are springs with substantially a same spring rate and spring length.

6. The apparatus of claim 1, wherein the first seal assembly springs are mechanically connected to a back side of the first seal assembly body and a front side of the first seal assembly body comprises a striker plate configured to contact a deflector on a thrust reverser.

7. The apparatus of claim 1, wherein the second seal assembly springs are mechanically connected to a back side of the second seal assembly body and a front side of the second seal assembly body comprises a striker plate configured to contact a deflector on a thrust reverser.

8. The apparatus of claim 1, wherein each of the first seal assembly springs and the second seal assembly springs have spring rates below 144.5 lb/in.

9. An aircraft comprising the apparatus of claim 1, wherein the apparatus is a Krueger flap assembly, and wherein the aircraft comprises:
a fuselage;
the aircraft wing attached to the fuselage; and
an engine attached to the aircraft wing, the engine including a nacelle and a thrust reverser, wherein:
the Krueger flap main body is movably coupled to the leading edge of the aircraft wing and configured to rotate out in front of the aircraft wing leading edge,
the first Krueger seal assembly is configured to at least partly seal a gap between the Krueger flap main body and the nacelle when the Krueger flap main body is rotated out in front of the aircraft wing leading edge, and
the second Krueger seal assembly is configured to at least partly seal the gap between the Krueger flap main body and the nacelle when the Krueger flap main body is rotated out in front of the aircraft wing leading edge.

10. The aircraft of claim 9, wherein:
the Krueger flap main body is movably coupled to the leading edge of an aircraft wing along a hingeline;
the first seal assembly springs are mechanically connected to a back side of the first seal assembly body and a front side of the first seal assembly body includes a first seal assembly striker plate configured to contact at least a part of the thrust reverser; and the second seal assembly springs are mechanically connected to a back side of the second seal assembly body and a front side of the second seal assembly body includes a second seal assembly striker plate configured to contact at least a part of the thrust reverser.

11. The aircraft of claim 10, wherein the thrust reverser is configured to:
    translate towards the Krueger flap assembly; and
    contact the first seal assembly striker plate and/or the second seal assembly striker plate; and
    bias, towards the Krueger flap main body, the first Krueger seal assembly and/or the second Krueger seal assembly.

12. The aircraft of claim 10, wherein the thrust reverser includes at least one deflector configured to contact at least one of the first seal assembly striker plate and/or the second seal assembly striker plate.

13. A method comprising:
    rotating a Krueger flap main body in front of a leading edge of an aircraft wing;
    biasing a first Krueger seal assembly away from the Krueger flap main body;
    biasing a second Krueger seal assembly away from the Krueger flap main body;
    substantially sealing, with the first and second Krueger seal assemblies, a gap between the Krueger flap main body and a nacelle of an engine; and
    substantially sealing, with a seal member, a gap between the first Krueger seal assembly and the second Krueger seal assembly.

14. The method of claim 13, wherein the second Krueger seal assembly is biased away from the Krueger flap main body through a plurality of seal assembly springs grounded to the second Krueger seal assembly.

15. The method of claim 13, further comprising:
    translating a thrust reverser of the engine towards at least one of the first Krueger seal assembly and the second Krueger seal assembly; and
    contacting, with the thrust reverser, at least one of the first Krueger seal assembly and the second Krueger seal assembly; and
    biasing at least one of the first Krueger seal assembly and the second Krueger seal assembly towards the Krueger flap main body.

16. A method comprising:
    receiving a Krueger flap assembly comprising:
        a Krueger flap main body,
        a flap hinge with a first end mechanically connected to the Krueger flap main body and a second end,
        a first Krueger seal assembly hinged to the Krueger flap main body,
        a second Krueger seal assembly hinged to the Krueger flap main body adjacent to the first Krueger seal assembly, and
        a seal member coupled to at least one of the first or second Krueger seal assemblies;
    attaching the second end of the flap hinge to a wing hinge located on a leading edge of an aircraft wing;
    attaching a first end of an actuator to the aircraft wing; and
    attaching a second end of the actuator to the Krueger flap main body.

17. The method of claim 16, further comprising inserting a fastener into attachment features on the second end of the flap hinge and the wing hinge to couple the flap hinge to the wing hinge.

18. The method of claim 16, wherein attaching the first end of the actuator to the aircraft wing comprises:
    attaching the first end to a wing actuator hinge located on the aircraft wing; and
    attaching the second end to a Krueger flap actuator hinge located on the Krueger flap main body.

19. The method of claim 16, wherein the Krueger flap assembly further comprises a drive linkage with a first drive linkage end mechanically connected to the Krueger flap main body and a second drive linkage end, and wherein the method further comprises attaching the second drive linkage end to a wing linkage hinge located on the aircraft wing.

20. The method of claim 19, further comprising inserting a fastener into attachment features on the second drive linkage end of the drive linkage and the wing linkage hinge to couple the drive linkage to the wing linkage hinge.

* * * * *